US009388682B2

(12) United States Patent
Tilke

(10) Patent No.: US 9,388,682 B2
(45) Date of Patent: Jul. 12, 2016

(54) HAZARD AVOIDANCE ANALYSIS

(71) Applicant: SCHLUMBERGER TECHNOLOGY CORPORATION, Sugar Land, TX (US)

(72) Inventor: Peter Gerhard Tilke, Belmont, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 236 days.

(21) Appl. No.: 14/162,682

(22) Filed: Jan. 23, 2014

(65) Prior Publication Data
US 2014/0209300 A1 Jul. 31, 2014

Related U.S. Application Data

(60) Provisional application No. 61/756,789, filed on Jan. 25, 2013.

(51) Int. Cl.
*E21B 47/00* (2012.01)
*E21B 43/017* (2006.01)
*G01V 99/00* (2009.01)

(52) U.S. Cl.
CPC .............. *E21B 47/00* (2013.01); *E21B 43/017* (2013.01); *G01V 99/005* (2013.01); *G01V 2210/642* (2013.01); *G01V 2210/646* (2013.01)

(58) Field of Classification Search
CPC ......... E21B 43/30; E21B 44/00; E21B 47/00; E21B 47/002
See application file for complete search history.

(56) References Cited

U.S. PATENT DOCUMENTS

| 6,711,529 | B1 | 3/2004 | Thore | |
|---|---|---|---|---|
| 2008/0289877 | A1* | 11/2008 | Nikolakis-Mouchas | E21B 7/04 175/57 |
| 2009/0152005 | A1* | 6/2009 | Chapman | E21B 7/00 175/24 |
| 2010/0271232 | A1 | 10/2010 | Clark et al. | |
| 2011/0153300 | A1* | 6/2011 | Holl | E21B 47/022 703/10 |
| 2011/0161133 | A1* | 6/2011 | Staveley | E21B 44/00 705/7.28 |
| 2011/0172976 | A1 | 7/2011 | Budiman et al. | |
| 2011/0264429 | A1* | 10/2011 | Lee | E21B 47/022 703/10 |

FOREIGN PATENT DOCUMENTS

WO 2009079160 6/2009
WO 2011096964 8/2011

OTHER PUBLICATIONS

Poedjono et al., "SPE 121094: Anti-Collision Risk Management for Real-World Well Placement," SPE International, 2009: pp. 1-16.
(Continued)

*Primary Examiner* — William P Neuder

(57) ABSTRACT

A method, apparatus and program product utilize infeasible regions projected onto sets of substantially parallel feasibility planes extending through a subsurface region to perform anti-collision and other types of hazard avoidance analysis. Hazards, e.g., existing well trajectories, that intersect the feasibility planes, as well as any uncertainties associated therewith, may be represented as infeasible regions in the feasibility planes, such that an analysis of the feasibility of a proposed well trajectory may be determined in a computationally efficient manner through a comparison of the locations, within one or more feasibility planes, of the proposed well trajectory and any infeasible regions defined in such feasibility planes.

21 Claims, 14 Drawing Sheets

(56) References Cited

OTHER PUBLICATIONS

Thorogood et al., "SPE 20908: Quantitive Risk Assessment of Subsurface Well Collisions," SPE International, 1990: pp. 265-272.
Thorogood et al., "SPE 19989: The Traveling-Cylinder Diagram: A Practical Tool for Collision Avoidance," SPE International, 1991: pp. 31-36.

International Search Report and Written Opinion of PCT Application No. PCT/US2014/012949 dated Jun. 10, 2014: pp. 1-9.
EP14742972.4, EP Search Report, dated Mar. 18, 2016, 3 pgs.
EP14742972.4, EP Article 94(3) Communication, dated Apr. 13, 2016, 6 pgs.

* cited by examiner

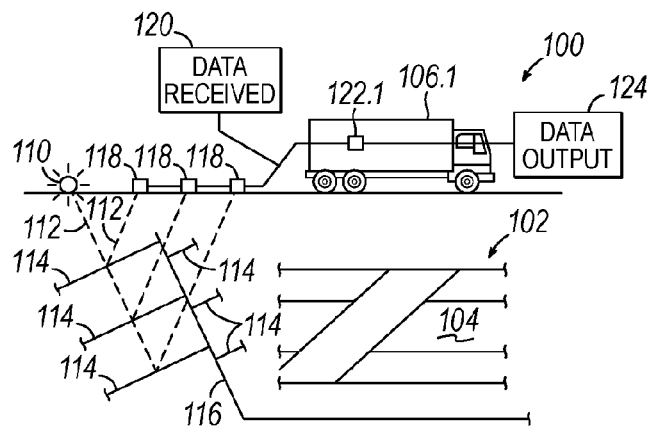
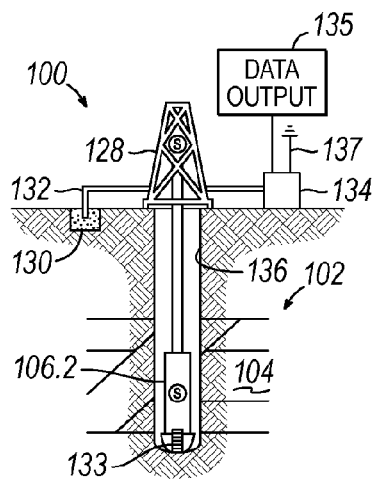
FIG. 2A    FIG. 2B
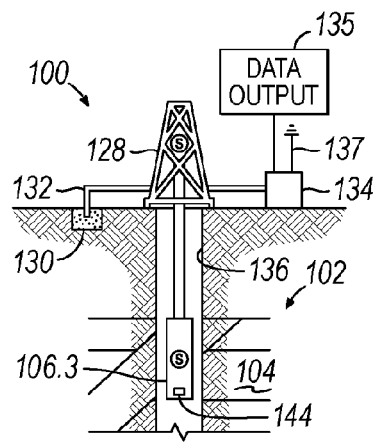
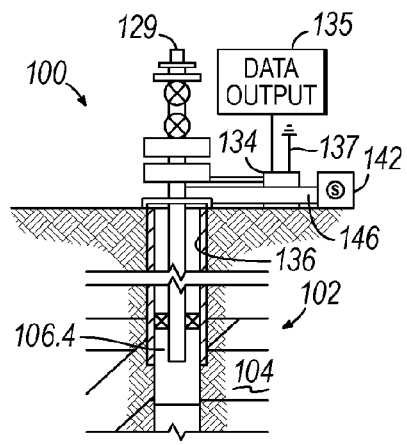
FIG. 2C    FIG. 2D

HAZARD AVOIDANCE ANALYSIS

CROSS-REFERENCE TO RELATED APPLICATION

This application claims the benefit of U.S. Provisional Patent Application No. 61/756,789 filed Jan. 25, 2013, which is incorporated herein by reference in its entirety.

BACKGROUND

Well placement planning is used in a number of industries to plan out the placement of prospective wells. In the oil & gas industry, for example, well placement planning is used to select placements and trajectories for proposed wells into a subsurface reservoir to reach specific locations in the reservoir that are believed to contain recoverable hydrocarbons.

Determining a suitable placement and trajectory for a well, however, is often complicated by the presence of subsurface hazards. The hazards may be in the form of existing wells and/or geological hazards such as salt bodies, faults and fracture networks. Particularly in some mature and/or large reservoirs, the hazard landscape can be extremely complex, as some reservoirs may have hundreds of existing wells, as well as geological hazards that need to be avoided when drilling a new well. In addition, as these hazards are within a subsurface, and potentially thousands of meters below the surface, the hazards necessarily have some degree of positional and geometric uncertainty, which further complicates the determination of a suitable placement and trajectory for a new well.

Conventionally, hazard avoidance analysis is performed within a three-dimensional environment, and is centered around the proposed trajectory of a well. At various points (also referred to as depths) along the proposed trajectory, a separation vector is defined from a point on the proposed trajectory to the closest point on a hazard (e.g., an existing well), and a risk of collision is calculated as a function of the uncertainty in both the proposed and existing wells (as a proposed well, as with an existing well, will also be subject to some degree of uncertainty). Performing hazard avoidance analysis in this manner, however, has been found to be extremely computationally expensive, in part due to the fact that the calculations are performed within a three dimensional environment, and are therefore mathematically complex.

In addition, it has been found that uncertainties in trajectory geometries are generally not isotropic. To better model such uncertainties, the uncertainty at a particular point on a well trajectory may be represented as a relatively complex geometric shape such as an ellipsoid normal to the well trajectory at that point, with the three principal axes of the ellipsoid representing measured depth uncertainty, azimuthal uncertainty, and inclination uncertainty. These respective uncertainty ellipsoids of a proposed and existing well may then be compared, honoring the potentially different orientations of the ellipsoids, with the value of the resulting oriented separation factor determining whether the proposed trajectory location is valid from a hazard-avoidance collision perspective. Such a computation, however, is generally repeated for every existing well or other hazard with respect to the proposed well. Further, the computations performed at one point along the trajectory of the proposed well also are repeated for other points along the trajectory.

While the latter approach has been found to be both precise and effective in many situations, the computations involved with the approach can be extremely expensive from a computational standpoint, particularly when the number of existing wells is very large, the geometry of the existing wells is complex, and/or the number of proposed wells being considered is large. In addition, in other workflows, such as well placement optimization, where an optimization engine proposes trajectory locations and geometries for multiple wells, and multiple trials are run to test new candidate trajectories, the computational expense of hazard avoidance can be prohibitive.

A need therefore exists in the art for a computationally efficient approach to hazard avoidance analysis.

SUMMARY

The embodiments disclosed herein provide a method, apparatus, and program product that utilize infeasible regions projected onto sets of substantially parallel feasibility planes extending through a subsurface region to perform anti-collision and other types of hazard avoidance analysis. Hazards, e.g., existing well trajectories, that intersect the feasibility planes, as well as any uncertainties associated therewith, may be represented as infeasible regions in the feasibility planes, such that an analysis of the feasibility of a proposed well trajectory may be determined in a computationally efficient manner through a comparison of the locations, within one or more feasibility planes, of the proposed well trajectory and any infeasible regions defined in such feasibility planes.

Therefore, in accordance with some embodiments, a method of analyzing hazards for at least one proposed well trajectory extending through a subsurface region is performed that includes performing a comparison of the at least one proposed well trajectory against a plurality of feasibility planes extending substantially parallel to one another in the subsurface region, where each feasibility plane includes an infeasible region associated with any hazard in the subsurface region that intersects such feasibility plane, and determining feasibility of the at least one proposed well trajectory based upon the comparison.

In accordance with some embodiments, an apparatus is provided that includes at least one processing unit and program code configured upon execution by the at least one processing unit to analyze hazards for at least one proposed well trajectory extending through a subsurface region by performing a comparison of the at least one proposed well trajectory against a plurality of feasibility planes extending substantially parallel to one another in the subsurface region, where each feasibility plane includes an infeasible region associated with any hazard in the subsurface region that intersects such feasibility plane, and determining feasibility of the at least one proposed well trajectory based upon the comparison.

In accordance with some embodiments, a program product is provided that includes a computer readable medium and program code stored on the computer readable medium and configured upon execution by at least one processing unit to analyze hazards for at least one proposed well trajectory extending through a subsurface region by performing a comparison of the at least one proposed well trajectory against a plurality of feasibility planes extending substantially parallel to one another in the subsurface region, where each feasibility plane includes an infeasible region associated with any hazard in the subsurface region that intersects such feasibility plane, and determining feasibility of the at least one proposed well trajectory based upon the comparison.

In accordance with some embodiments, an apparatus is provided that includes at least one processing unit, program code and means for analyzing hazards for at least one proposed well trajectory extending through a subsurface region by performing a comparison of the at least one proposed well trajectory against a plurality of feasibility planes extending substantially parallel to one another in the subsurface region, where each feasibility plane includes an infeasible region associated with any hazard in the subsurface region that intersects such feasibility plane, and determining feasibility of the at least one proposed well trajectory based upon the comparison.

In accordance with some embodiments, an information processing apparatus for use in a computing system is provided, and includes means for analyzing hazards for at least one proposed well trajectory extending through a subsurface region by performing a comparison of the at least one proposed well trajectory against a plurality of feasibility planes extending substantially parallel to one another in the subsurface region, where each feasibility plane includes an infeasible region associated with any hazard in the subsurface region that intersects such feasibility plane, and determining feasibility of the at least one proposed well trajectory based upon the comparison.

In some embodiments, an aspect of the invention involves generating a first feasibility plane among the plurality of feasibility planes, wherein generating the first feasibility plane includes, for each of a plurality of existing well trajectories in the subsurface region that intersect the first feasibility plane, projecting an associated uncertainty ellipse onto the first feasibility plane.

In some embodiments, an aspect of the invention includes that generating the first feasibility plane further includes expanding at least one uncertainty ellipse projected onto the first feasibility plane to account for uncertainty in the at least one proposed well trajectory.

In some embodiments, an aspect of the invention includes that generating the first feasibility plane further includes expanding at least one uncertainty ellipse projected onto the first feasibility plane to account for a confidence level.

In some embodiments, an aspect of the invention includes that generating the first feasibility plane further includes combining at least one uncertainty ellipse projected onto the first feasibility plane with an uncertainty ellipse from an adjacent feasibility plane that is associated with the same existing well trajectory among the plurality of existing well trajectories.

In some embodiments, an aspect of the invention involves storing the first feasibility plane in a database for reuse in a future hazard avoidance analysis operation.

In some embodiments, an aspect of the invention involves retrieving the plurality of feasibility planes from a database prior to performing the comparison.

In some embodiments, an aspect of the invention includes that the plurality of feasibility planes are substantially normal to and spaced from one another along a depth dimension of a Cartesian coordinate system.

In some embodiments, an aspect of the invention includes that the plurality of feasibility planes are substantially normal to a dimension of a global coordinate system.

In some embodiments, an aspect of the invention involves extracting a region from one or more of the plurality of feasibility planes prior to performing the comparison.

In some embodiments, an aspect of the invention includes that the plurality of feasibility planes are non-normal to at least a portion of the at least one proposed well trajectory.

In some embodiments, an aspect of the invention includes that determining feasibility of the at least one proposed well trajectory based upon the comparison comprises determining from the comparison that a first proposed well trajectory is feasible in response to the first proposed well trajectory not intersecting any infeasible region in any of the plurality of feasibility planes.

In some embodiments, an aspect of the invention involves drilling a wellbore substantially following the first proposed well trajectory after determining feasibility of the first proposed well trajectory.

In some embodiments, an aspect of the invention includes that determining feasibility of the at least one proposed well trajectory based upon the comparison comprises determining from the comparison that a first proposed well trajectory is infeasible in response to the first proposed well trajectory intersecting at least one infeasible region in at least one of the plurality of feasibility planes.

In some embodiments, an aspect of the invention includes that determining that the first proposed well trajectory is infeasible further comprises determining at least one of a cause and a magnitude of infeasibility for the first proposed well trajectory.

In some embodiments, an aspect of the invention includes that the program code is further configured to generate a first feasibility plane among the plurality of feasibility planes by, for each of a plurality of existing well trajectories in the subsurface region that intersect the first feasibility plane, projecting an associated uncertainty ellipse onto the first feasibility plane.

In some embodiments, an aspect of the invention includes that the program code is configured to generate the first feasibility plane further by expanding at least one uncertainty ellipse projected onto the first feasibility plane to account for at least one of uncertainty in the at least one proposed well trajectory and a confidence level.

In some embodiments, an aspect of the invention includes that the program code is configured to generate the first feasibility plane further by combining at least one uncertainty ellipse projected onto the first feasibility plane with an uncertainty plane from an adjacent feasibility plane that is associated with the same existing well trajectory among the plurality of existing well trajectories.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

The herein-described embodiments provide a method, apparatus and program product that utilize infeasible regions projected onto sets of substantially parallel feasibility planes extending through a subsurface region to perform anti-collision and other types of hazard avoidance analysis against hazards disposed within the subsurface region.

A hazard, in this regard, may include an existing well trajectory, as well as other volumes within a subsurface region that are desirably avoided from a hazard avoidance analysis perspective, e.g., natural formations such as salt structures or fracture networks. A subsurface region may include, for example, the subsurface of an offshore and/or land-based oilfield or other geographical region, and generally including a reservoir with recoverable products such as oil, gas, etc.

Feasibility planes, as used herein, are substantially planar surfaces that are oriented substantially parallel to one another and spaced apart from one another, in many instances along a dimension of a three dimensional Cartesian coordinate system, e.g., a global geographical coordinate system. Each feasibility plane may include one or more infeasible regions that are associated with one or more hazards in a subsurface region, and that are positioned within a feasibility plane proximate to the intersection between such hazards and the feasibility plane, although if no hazards intersect a particular feasibility plane, no infeasible regions are generally defined for that feasibility plane. As will become more apparent below, infeasible regions may be expanded or otherwise sized and shaped to account for uncertainty, e.g., due to uncertainty associated with a hazard, uncertainty associated with a proposed well trajectory and/or uncertainty that accounts for a confidence level. In addition, in some embodiments, feasibility planes may be used to represent uncertainty within an interval between adjacent feasibility planes, i.e., the volume of the subsurface region that extends between the adjacent planes, by combining the infeasible regions associated with the same hazards from the adjacent planes.

By representing hazards as infeasible regions in feasibility planes, hazard avoidance analysis for a proposed well trajectory may be performed by comparing the well trajectory, and in particular, the location of the intersection of the proposed well trajectory with one or more feasibility planes, with the locations of the infeasible regions in the one or more feasibility planes. Generally, such comparisons are substantially less computationally expensive due to the two dimensional comparison than assessing feasibility in a three dimensional domain using a trajectory-oriented approach.

Other variations and modifications will be apparent to one of ordinary skill in the art.

Hardware and Software Environment

Figure 1:
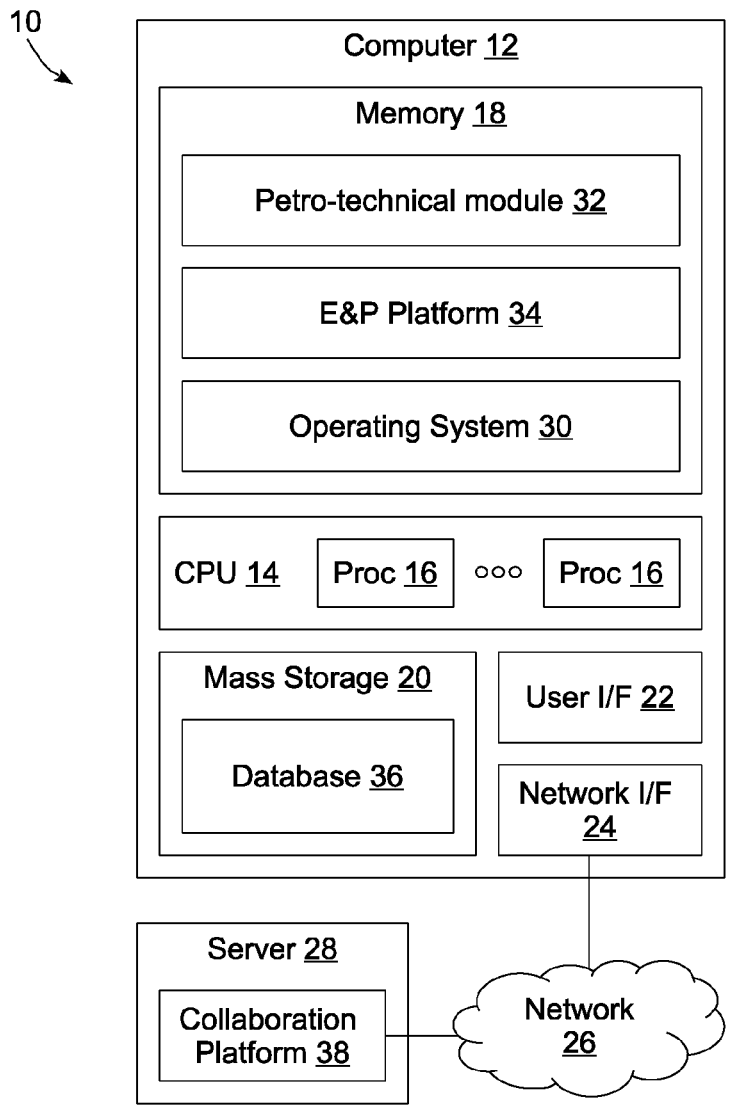
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected.

This technique may be used to optimize portions of the field operation, such as controlling drilling, weight on bit, pump rates or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water and/or sea. Also, while a single field measured at a single location is depicted, oilfield applications may be utilized with any combination of one or more oilfields, one or more processing facilities and one or more wellsites.

Figure 3:
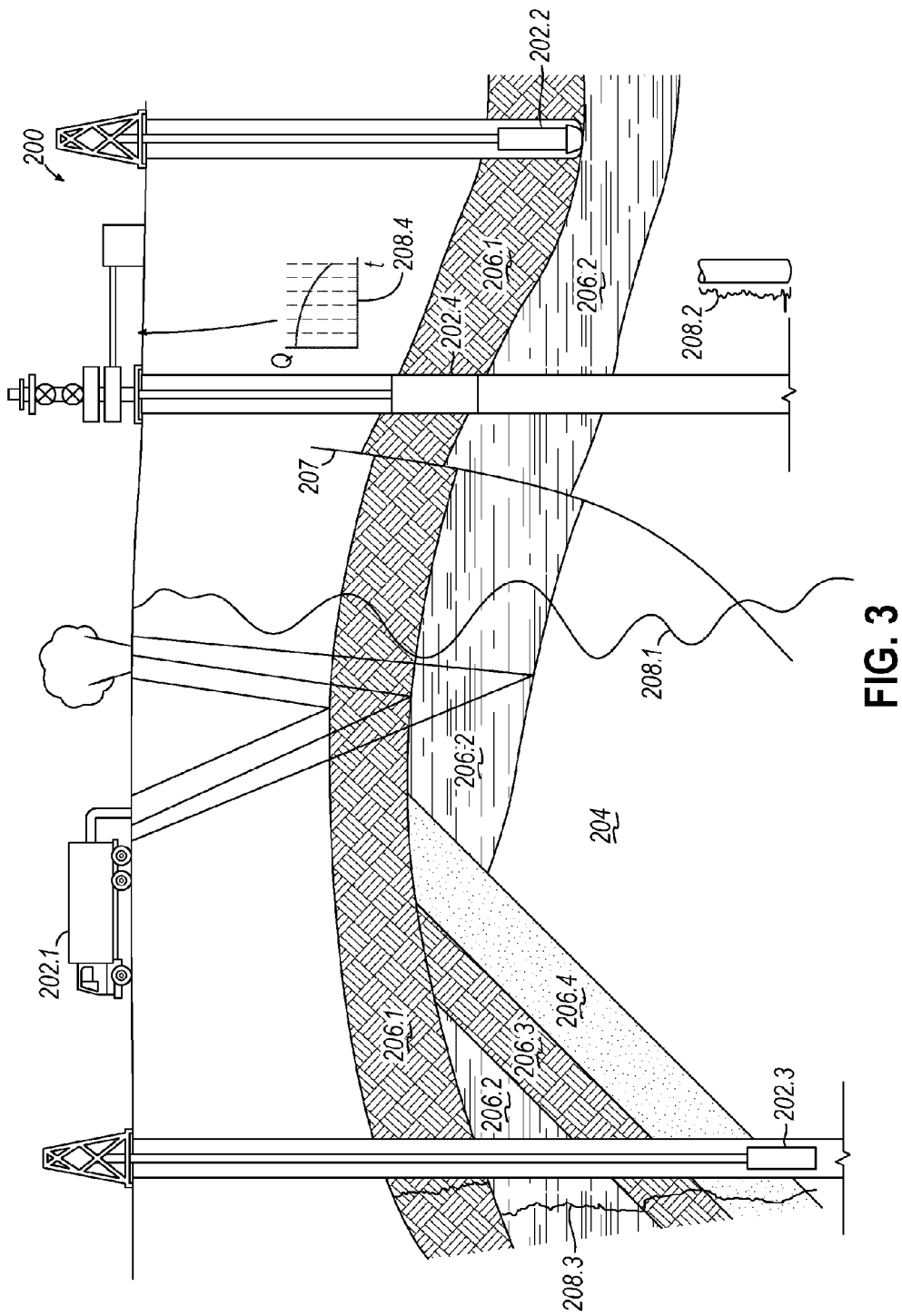
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
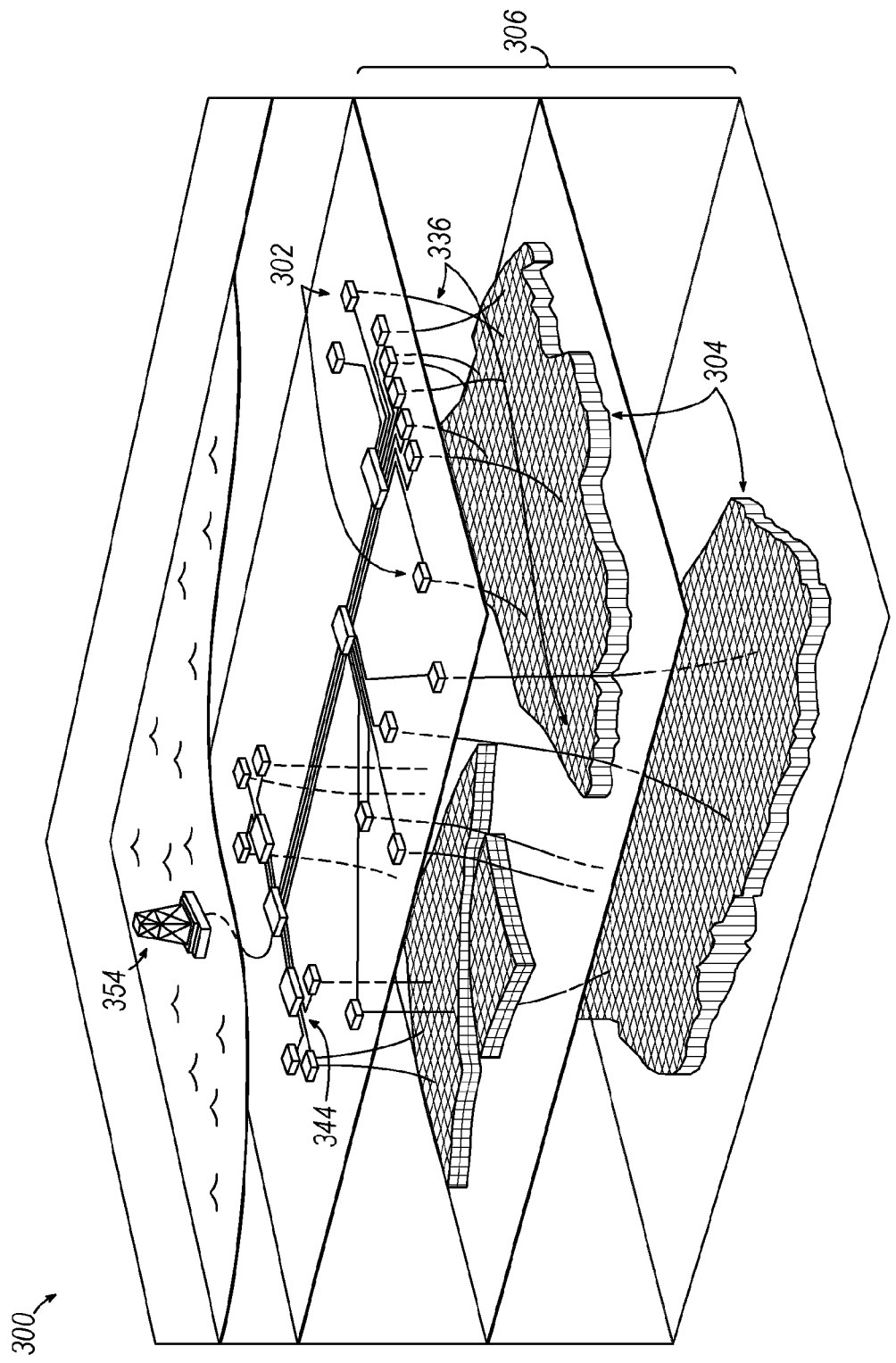
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Hazard Avoidance Analysis Utilizing Two Dimensional Uncertainty Projections

Figure 5:
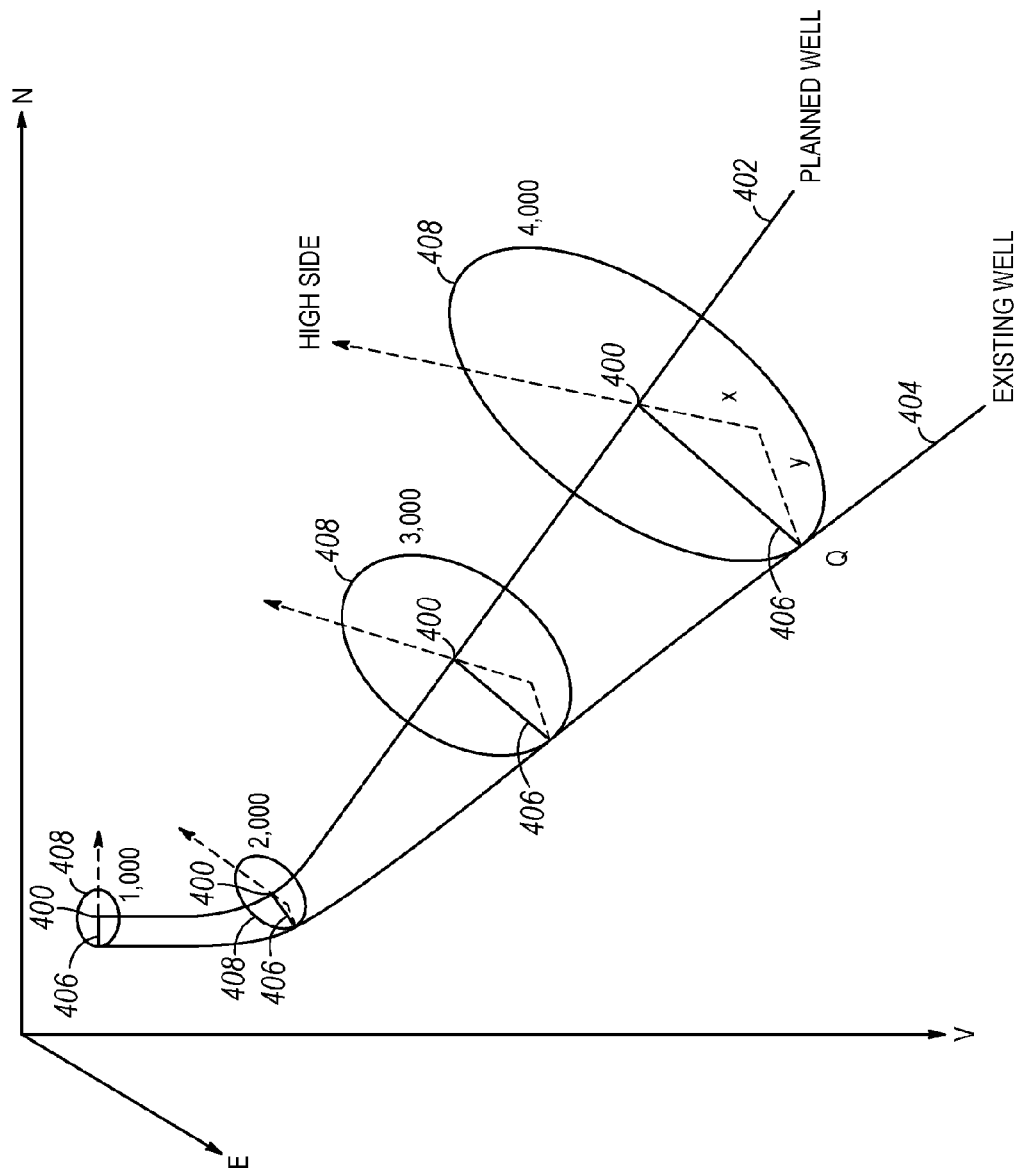
FIG. 5 is a perspective diagram of a planned well and an existing well, illustrating a traveling cylinder at successive depths along the planned well trajectory.

Embodiments consistent with the invention may be used to facilitate hazard avoidance analysis of proposed wells through the use of two dimensional or planar uncertainty projections. As noted above, a conventional approach to hazard avoidance analysis, also referred to anti-collision analysis, compares the geometry of a proposed trajectory with each existing trajectory associated with an existing well on a point-by-point basis. For example, as illustrated in FIG. 5, when performing anti-collision analysis for a proposed well against an existing well, at each of a plurality of depth points 400 of a proposed well trajectory 402, the closest distance to an existing well trajectory 404 is computed as a separation vector at 406. Risk of collision is then calculated at each separation vector 406 as a function of the uncertainty in both the new and existing wells. In addition, while this approach is computationally intensive, some simplifying assumptions may be used, e.g., where at a separation vector the positional uncertainty of a proposed well and an existing well are assumed to be constant with increasing depth.

Other approaches recognize that uncertainties in trajectory geometries may not be isotropic. For example, azimuthal uncertainty may differ from inclination uncertainty. As such, the uncertainty of any point on a trajectory may be represented as an ellipsoid normal to the trajectory vector at that point. The three principal axes of the ellipsoid are thus the measured depth uncertainty, the azimuthal uncertainty, and the inclination uncertainty. In such approaches, the respective uncertainty ellipsoids of proposed and existing wells are compared, honoring the potentially different orientations of the ellipsoids and the value of the resulting oriented separation factor determines whether the proposed trajectory location is valid from an anti-collision perspective. In such approaches, this computation is repeated for every existing well with respect to a proposed well, as well as along the trajectory of the proposed well.

However, as also noted above, while this approach can be both precise and effective when planning new wells from platforms with many existing wells. In many instances the computation becomes too expensive when the number of existing wells is very large, the geometry of the existing wells is complex or the number of proposed wells being considered is large. In addition, another workflow where this approach can be unacceptable from a performance perspective is well placement optimization, where an optimization engine proposes trajectory locations and geometries in which feasibility from an anti-collision perspective is determined. This analysis generally is repeated as new candidate trajectories are proposed, requiring significant computational resources to complete the analysis.

Figure 6:
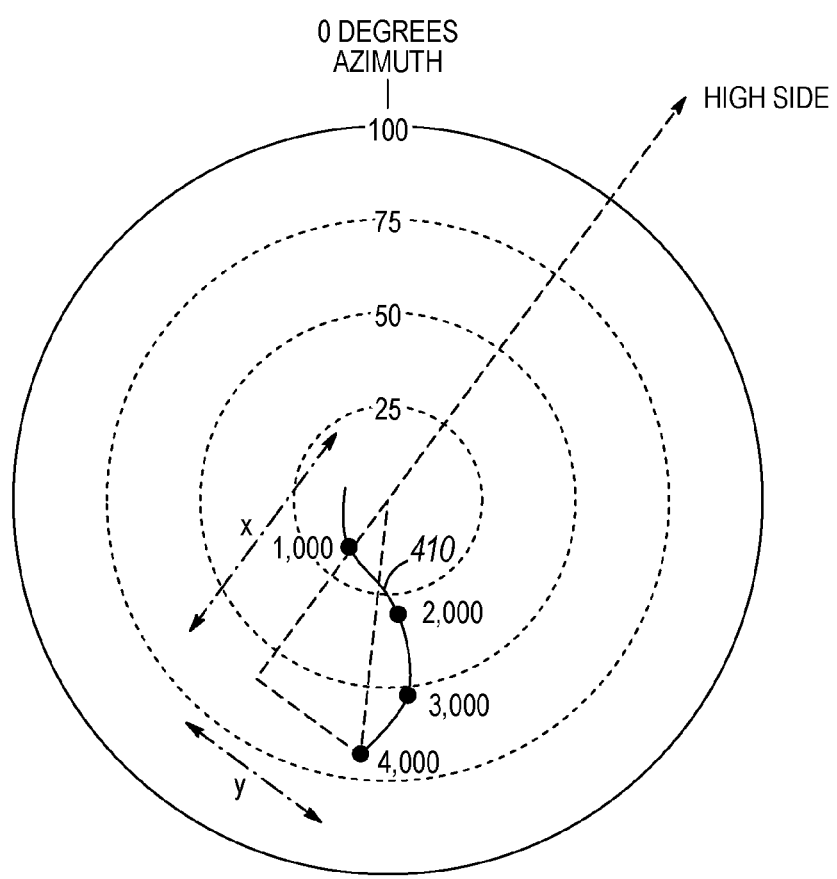
FIG. 6 is a traveling cylinder view of the planned well of FIG. 5, in a coordinate system of the planned well with an existing well appearing as a line with the measured depth (MD) of the existing well labeled along this line.

By way of further explanation, FIG. 6 illustrates an example traveling cylinder plot, which may generally be used to visualize collision risk. Returning briefly to FIG. 5, a traveling cylinder may be thought of as a disk 408 moving along a subject trajectory 402 with the axis of the disk 408 coincident with and parallel to the trajectory 402. As the disk 408 moves down the trajectory 402, an offset trajectory, e.g., the trajectory 404 of an existing well against which collision risk is being assessed, may be visualized as an intersection with the disk 408 at each successive depth. Thus, as illustrated in FIG. 6, an offset trajectory may be mapped as a curving line 410 along the surface of the disk, with the distance of line 410 from the center of the disk being the distance of the offset trajectory from the subject trajectory at a given depth (e.g., with points corresponding to depths at 1000, 2000, 3000, and 4000 m illustrated in FIG. 6).

Figure 7:
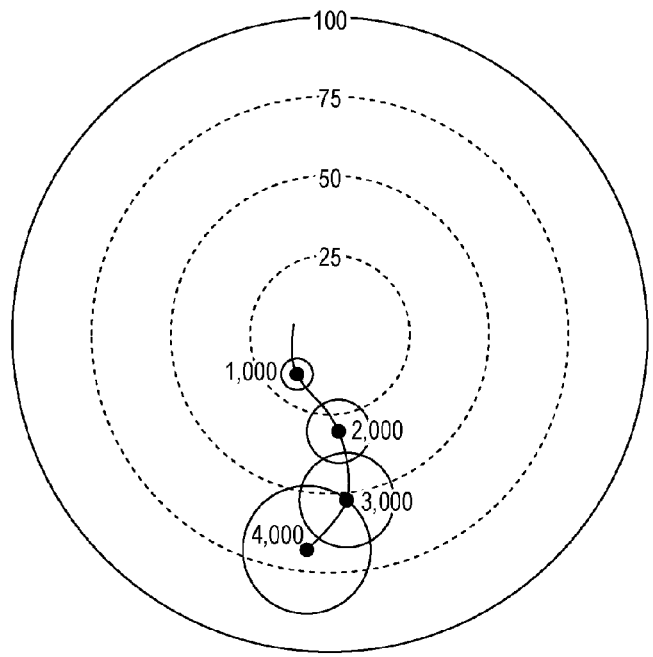
FIG. 7 is a traveling cylinder view of the planned well of FIG. 5, illustrating the projected uncertainty of an existing well relative to the planned well at successive measured depths.
Figure 8:
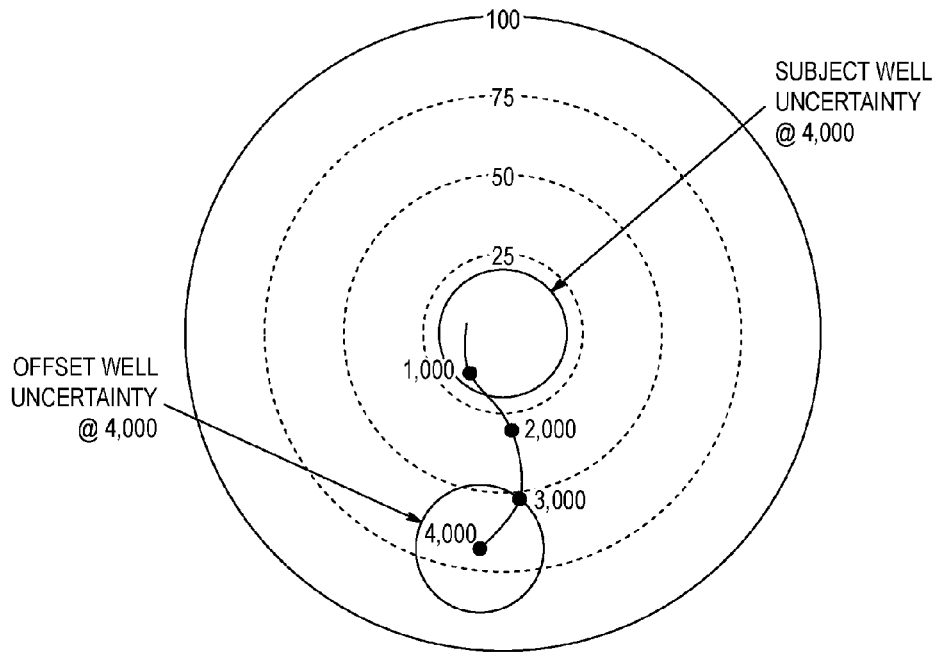
FIG. 8 is a traveling cylinder view of the planned well of FIG. 5, with uncertainty ellipses of the planned and existing well at a measured depth of 4,000 m.

Next, as shown in FIG. 7, a proposed (or subject) well and an existing (or offset) well will have positional uncertainty that generally increases with depth. The uncertainty ellipsoid at each depth for the subject well may be projected as an uncertainty ellipse onto the traveling cylinder plot. The uncertainty ellipse represents the region near the subject well above which a probability of collision (pc) exceeds an acceptable value. Since the subject and offset wells each have a positional uncertainty, these uncertainties are generally combined to compute the pc, as illustrated in FIG. 8.

For the purposes of the discussion hereinafter, assume the following definitions:
rd: the relative displacement vector between a point A on a subject well and point B on an offset well.
x: a point on rd.
$\vec{n}$: the unit normal vector along on rd.
μ: the expected location of B along rd.
cov(A): the uncertainty covariance matrix of the point A.
cov(B): the uncertainty covariance matrix of the point B.

The probability density function of the existence of well B along the vector rd may be given by $$p(x) = \frac{1}{\sqrt{2\pi}\sigma_{rd}} e^{-\frac{1}{2}\left(\frac{x-\mu}{\sigma_{rd}}\right)^2},$$

where $$\sigma_{rd}^2 = \vec{n}^T \text{COV}(rd)\vec{n}$$

and $$\text{cov}(rd) = \text{cov}(A) + \text{cov}(B).$$

The two wells may be considered to have collided when $$x \leq x_c,$$

where xc is the sum of the radii of the two wells.

If the normalized clearance λ between the two wells is defined as $$\lambda = \frac{\mu - x_c}{\sigma_{rd}},$$

then $$pc = \frac{1}{2}\text{erfc}\left(\frac{\lambda}{\sqrt{2}}\right).$$

The minimum normalized clearance $\lambda_{min}$ may then be expressed as $$\lambda_{min} = \sqrt{2}\text{erfc}^{-1}(2pc_{max}).$$

In some instances, the minimum confidence for collision avoidance may be set at 95% (2.7955 sigma) in the absolute position of points A and B. As such, the minimum permissible separation of the two wells along rd using this minimum confidence is $$\mu_{min} = 2.7955(\sigma_A + \sigma_B) + x_c.$$

If a simplifying assumption is made that $$\sigma = \sigma_A = \sigma_B,$$

then $$\sigma_{min} = 2.7955\sqrt{2}\sigma_{rd} + x_c.$$

Consequently, $$\lambda_{min} = 2.7955\sqrt{2} = 3.95 \approx 4,$$

which implies $$pc_{max} \approx 1/26,000.$$

As such, an implication may be made that the minimum permissible separation between points A and B is approximately 4σ.

In embodiments consistent with the invention, uncertainties are projected onto discretely sampled planar (i.e., two dimensional) surfaces, referred to herein as feasibility planes, to effectively implement a 2.5 dimensional solution, in contrast with conventional approaches that treat trajectory anti-collision as a full three-dimensional problem. As noted above, a traveling cylinder plot, e.g., as illustrated in FIGS. 6-8, is conventionally used to represent trajectory uncertainties as ellipses on a plane normal to the trajectory of a subject well at the depth of interest. In embodiments consistent with the invention, on the other hand, trajectory uncertainties may be represented as ellipses or other geometries projected onto a plurality of feasibility planes that are all substantially parallel to one another, and thus that do not vary in orientation with the trajectory of a proposed or subject well. Thus, for any trajectories that are not precisely normal to the plurality of feasibility planes, the trajectory uncertainties will be non-normal relative to the well trajectories.

In some embodiments, for example, the plurality of feasibility planes may be normal to a dimension of a global three dimensional coordinate system, e.g., normal to north/south (e.g., latitude), east/west (e.g., longitude), or depth (e.g., relative to sea level). If, for example, the plurality of feasibility planes are substantially horizontal planes oriented normal to a depth dimension (which is generally appropriate in the overburden of a subsurface region where the trajectory geometry is typically vertical or of relatively low inclination), then a plot may be made that is superficially similar to a traveling cylinder plot, but that is instead a map of trajectory uncertainties at a given depth, as is a case with the map illustrated in FIG. 9. As will become more apparent below, for well trajectories that are predominantly horizontal, vertical planes that are normal to latitude, longitude or another dimension, e.g., in an average azimuth of the laterals of a well trajectory, may be used instead.

The use of substantially parallel planes in anti-collision analysis allows for an approach that differs in a number of respects from conventional approaches that rely on trajectory-oriented uncertainties. First, the coordinate system of the substantially parallel planes may be rectilinear rather than polar, e.g., a Cartesian coordinate system. Second, the coordinate system of the substantially parallel planes may be a global geographic coordinate system, or at least may be defined for an entire reservoir or other subsurface region that encompasses all well trajectories and/or hazards of interest. Third, the locations of uncertainty ellipses may be defined in a coordinate system centered at the intersection of a trajectory with a plane. Fourth, an uncertainty ellipse may be defined based upon the intersection of a trajectory-oriented uncertainty tunnel (i.e., a three-dimensional volume comprising the union of the trajectory-oriented uncertainty ellipses at a plurality of measured depths) with a plane.

In one embodiment, for example, a depth plane approach may be used to represent trajectory uncertainty in absolute global coordinates, as well as with substantially horizontal feasibility planes separated from one another along a depth axis. Doing so provides a number of advantages in some workflows over an approach that defines coordinates relative to a subject well. First, uncertainty ellipses generally may be computed once for each well-plane combination, such that maps of uncertainty may be generated once for all of the existing wells in a reservoir or subsurface region, or for a particular project. Doing so can be of significant benefit in modern mature brownfields where hundreds to thousands of wells may already exist. Second, a significant benefit may be realized due to the fact that many modern wells have tens of thousands of survey records, which may only have to be analyzed once. Third, from an anti-collision perspective, once uncertainty ellipses have been extracted and projected onto the planes, the existing trajectories may no longer be required, which may present a significant savings in terms of computational resources.

Figure 9:
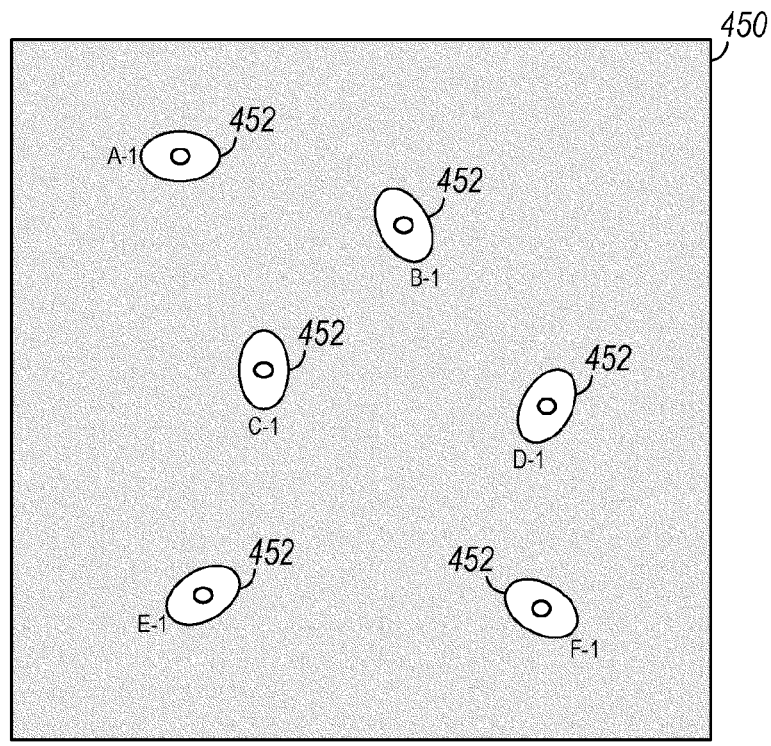
FIG. 9 is a map of a depth plane illustrating projected uncertainty ellipses for existing wells in absolute global coordinates.

By way of example, FIG. 9 illustrates an example depth plane 450 including uncertainty ellipses 452 for multiple existing wells, designated as A-1, B-1, C-1, D-1, E-1 and F-1. The depth plane is oriented substantially normal to a depth dimension, and may be defined in terms of absolute coordinates, or relative to a subsurface region. In this embodiment, the available drilling tunnel for a subject or proposed well may be considered to be affected by (1) the uncertainties of the existing/offset wells, (2) the uncertainty of the proposed/subject well, and (3) expansion of uncertainties to consider a predetermined (e.g., 95%) confidence level in the absolute uncertainty. By computing the uncertainty ellipses 452 intersecting depth plane 450, factor (1) is accounted for, and if there was no uncertainty in the position of the proposed/subject well, the regions outside the uncertainty ellipses 450 would represent the available drilling tunnels or "feasible regions."

Figure 10:
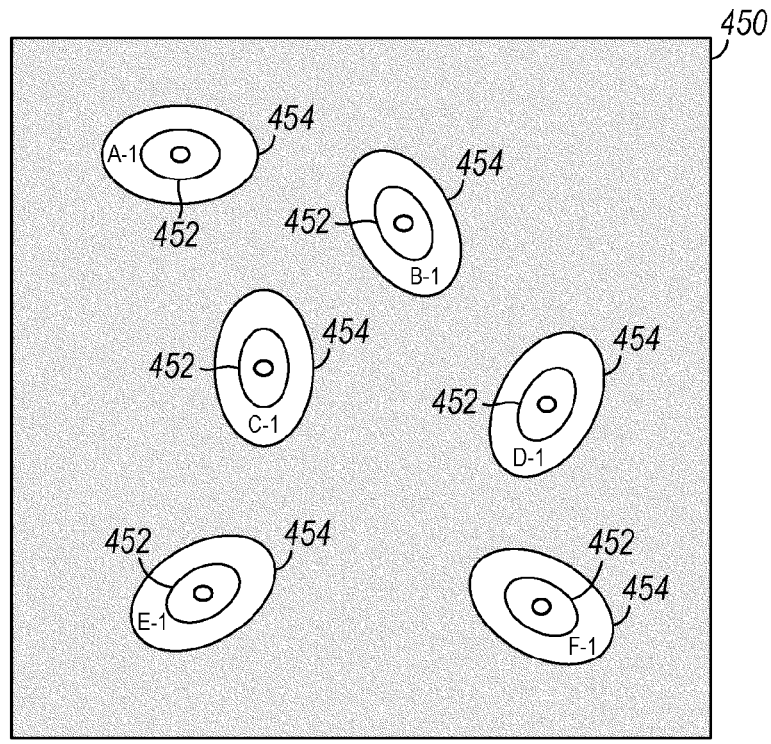
FIG. 10 is a map of the depth plane of FIG. 9, with uncertainty ellipses expanded to account for uncertainty of a proposed well.

However, uncertainty generally exists in the location of a proposed well that may also be accounted for. In the overburden, trajectories are generally either vertical or modestly inclined, so at a given vertical depth, the measured depth and consequently the uncertainty of a proposed well may be estimated to account for factor (2), and may be considered to expand the uncertainty of each existing well, thereby further reducing the feasible region for proposed wells. FIG. 10, for example, illustrates the expansion of uncertainty ellipses 452 into regions 454.

It will be appreciated, however, that the uncertainty ellipses generally only represent the joint 1σ uncertainties. As such, as illustrated by regions 456 in FIG. 11, uncertainty ellipses 452 may further be "grown" to account for a desired confidence level and thereby account for factor (3). For example, to provide a 95% confidence level, uncertainty ellipses 452 may be grown by a factor of $\frac{1}{2}\lambda_{min}$ (2.0), thereby further reducing the "feasible region" for proposed wells.

Figure 11:
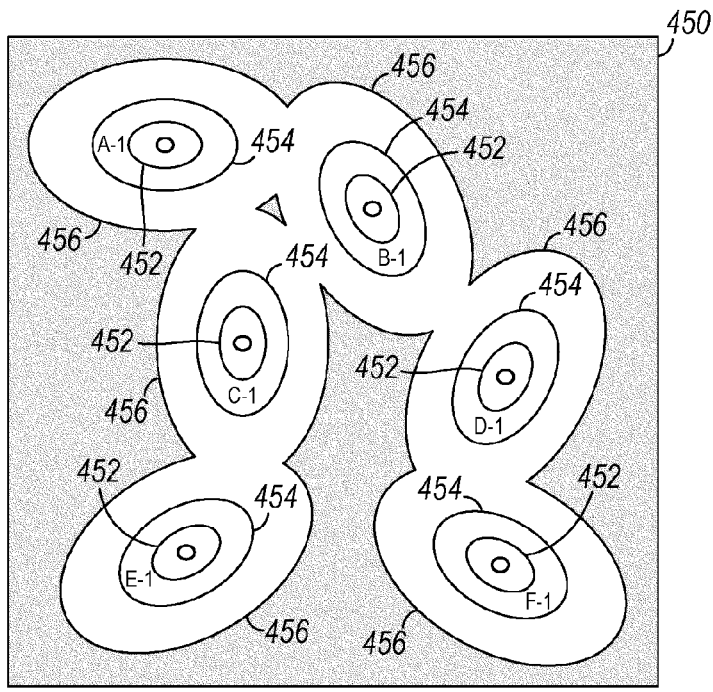
FIG. 11 is a map of the depth plane of FIG. 10, with uncertainty ellipses further expanded to account for a confidence level.

As such, the expanded uncertainty ellipses 452 illustrated in FIG. 11 may be considered to define infeasible regions that new trajectories should avoid. The remaining area in depth plane 450 thus represents the feasible region for new wells.

Also, in some embodiments, when analyzing collision risk, a depth plane may be used to represent the interval between a current plane and an immediately shallower plane. It will be appreciated that if the trajectory of an existing well is inclined then the uncertainty ellipses will have differing locations in adjacent planes, and thus, in some embodiments it may be desirable to represent the uncertainty "cylinder" within the interval between the planes as a convex hull around the two ellipses in the adjacent planes. It should also be noted that even if a proposed well is highly inclined, or horizontal, the depth plane will represent a volume of the subsurface to be avoided.

Figure 12:
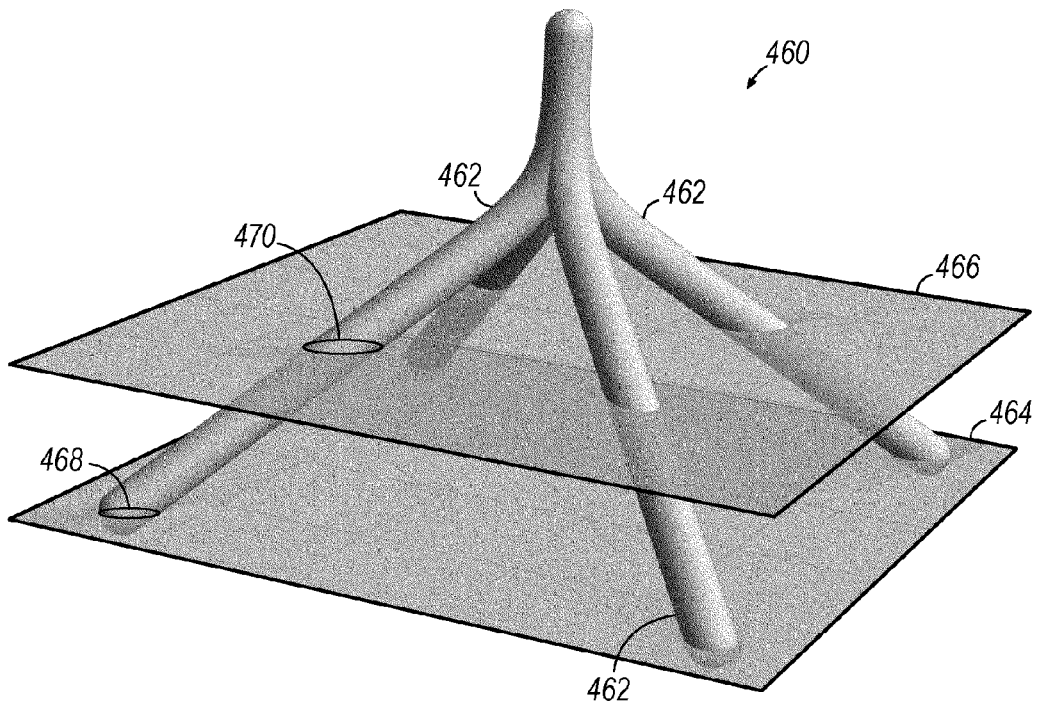
FIG. 12 is a perspective view of an example subsurface region illustrating an interval between adjacent depth planes.
Figure 13:
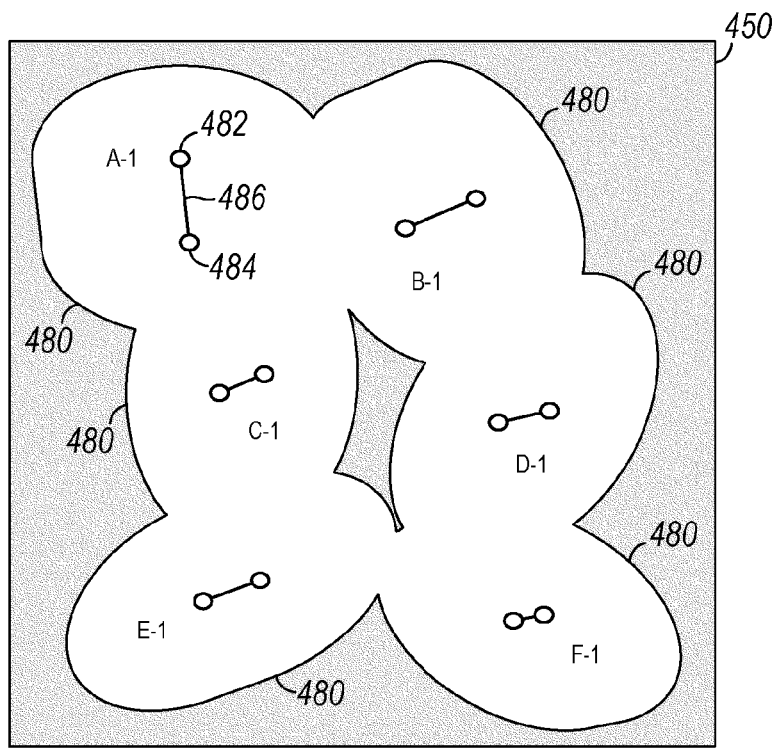
FIG. 13 is a map of the depth plane of FIG. 11, with infeasible regions representing the uncertainty ellipses within the interval between adjacent depth planes, and with trajectory segments for the existing wells additionally shown.

Thus, for example, as illustrated in FIG. 12, for a subsurface volume or region 460 including a plurality of existing well trajectories 462, a current plane 464 and an immediately shallower plane 466 that intersect the well trajectories will define uncertainty ellipses for the same trajectory in differing locations, e.g., as is the case with uncertainty ellipses 468, 470. As shown in FIG. 13, therefore, the uncertainty ellipses for the same trajectories in the adjacent planes may be combined into convex hulls 480. It should be noted that FIG. 13 additionally illustrates centers 482, 484 of the uncertainty ellipses in the current (center 482) and adjacent (center 484) planes, with the migrations of these centers between the planes represented by trajectory segments 486.

Once the infeasible regions, represented by convex hulls 480, have been determined, determination of the feasibility of proposed trajectories can be determined very efficiently. For example, when a new trajectory is proposed, the coordinate for a given depth plane may be determined, and using computationally efficient algebraic topology routines, the containment of the coordinate within the feasible region of the depth plane may easily be determined. Further, in some embodiments, the magnitude of the potential infeasibility may be obtained to assist with determining a feasible location. In some embodiments, this analysis may be repeated for one or more depth planes to determine the overall feasibility for a proposed trajectory. Further, in some embodiments, this analysis may be repeated for every depth plane to determine the overall feasibility for a proposed trajectory.

Figure 14:
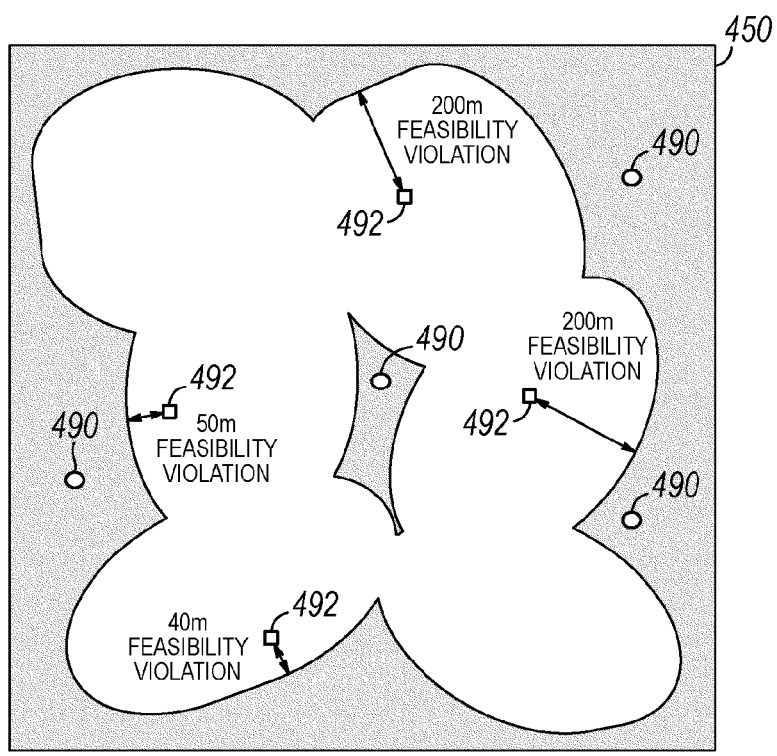
FIG. 14 is a map of the depth plane of FIG. 13, with feasible and infeasible proposed trajectories illustrated.

FIG. 14, for example, illustrates a plurality of proposed trajectories 490, 492 overlaid on depth plane 450, with trajectories 490 being found to be within a feasible region and trajectories 492 being found to be within an infeasible region (i.e., within a convex hull 480). In addition, the distance associated with each feasibility violation of each trajectory 492 is shown, representing the magnitude of the potential infeasibility of the trajectory (higher numbers represent higher infeasibility). In some embodiments, in addition to a well being marked as infeasible, the cause and/or magnitude of infeasibility may be captured and returned with the results of an analysis. The cause may be, for example, the plane on which it failed, whether it was a well or geologic hazard, and/or which well or hazard caused the infeasibility.

It may also be desirable in some embodiments to select a number of depth planes and their relative spacing to balance accuracy with computational expense. In general, greater numbers of depth planes increase the accuracy of the representation of uncertainty, which is particularly applicable the greater the complexities of the existing wells. On the other hand, the fewer the number of depth planes, the less computationally expensive, and thus, the faster the anti-collision performance.

In one embodiment, for example, selection of a number and spacing of depth planes may be performed as follows. Let N be the total number of depth planes, and Z be the set of depth values with $z_0$ being the shallowest depth value (e.g. sea level), $z_1$ being the shallowest depth plane value, and $z_N$ being the deepest depth plane value. Then:

$$Z=\{Z_0, Z_1, \ldots, Z_N\}$$

and $$Z_0 < Z_j < Z_{j+1} < Z_N.$$

With these constraints, values of $z_1$ to $z_{N-1}$ may be computed as follows. First, a "drift complexity" may be calculated from the surface $z_0$ to the maximum depth $z_N$. The drift complexity may be sampled at a finer resolution than the expected smallest depth plane interval, and at a given depth, the drift of a well may be expressed as follows:

$$W_{ik} = x_k^2 + y_k^2,$$

where k is the $k^{th}$ depth at the fine scale, and $x_k$ and $y_k$ are the x and y displacements of the trajectory relative to the surface location.

If M is the total number of wells being considered, $F_k$ may be calculated as the drift for the entire set of wells at the $k^{th}$ depth, that is $$F_k = \sum_{i=1}^{i=M} W_{ik}.$$

The change in drift from the $k^{th}-1$ to $k^{th}$ depth may then be expressed as $$\Delta F_k = F_k - F_{k-1}.$$

Figure 15:
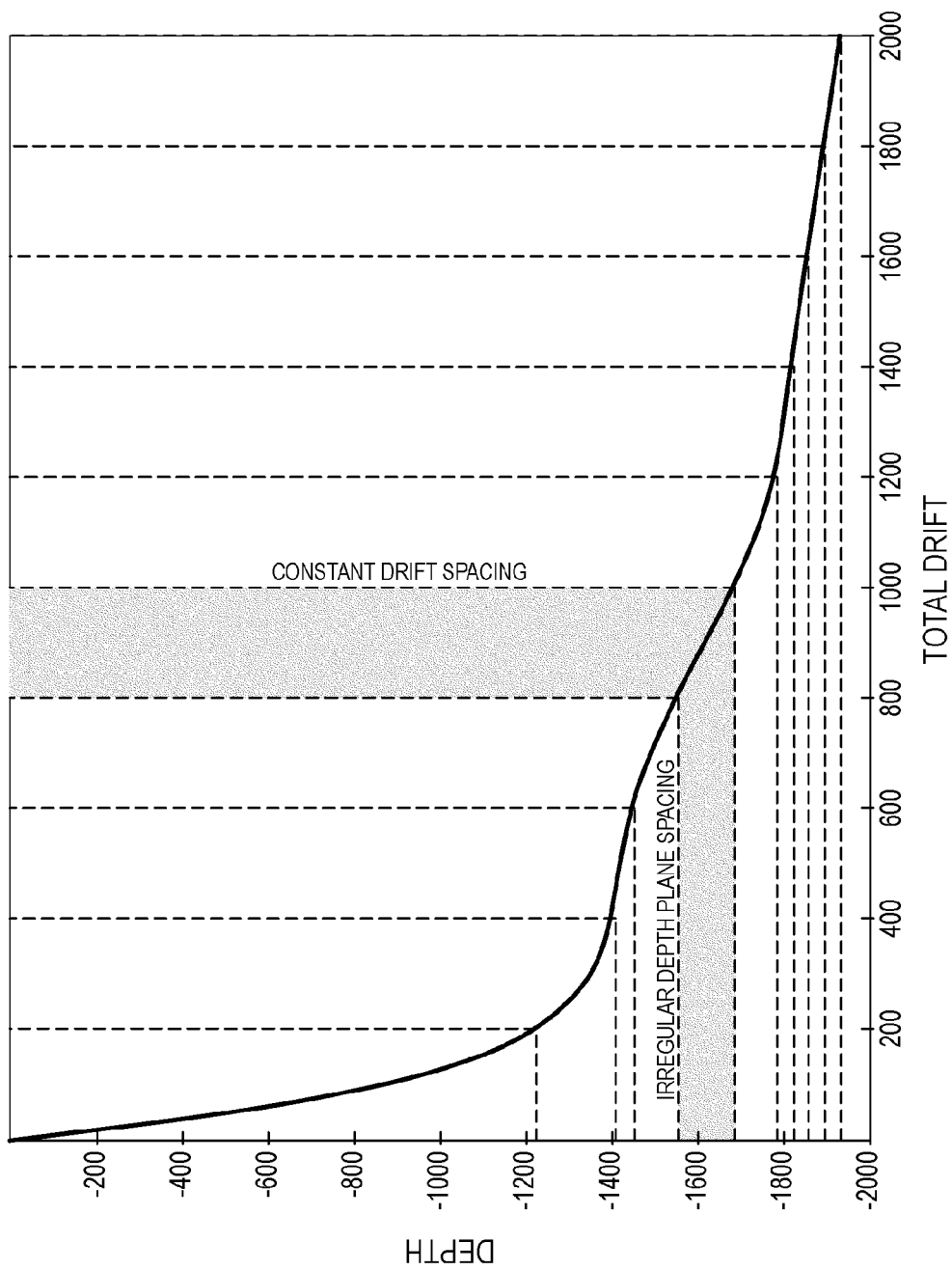
FIG. 15 is an example graph of trajectory drift for a subsurface region versus depth, where the drift magnitude is partitioned into equal magnitudes such that corresponding depths for depth planes may be determined.

To solve for the depth values of the depth planes ($z_0$ to $z_{N-1}$), $F_k$ may be plotted vs. the $k^{th}$ depth value, as illustrated in FIG. 15. The F axis may then be divided into the N depth values desired to obtain the corresponding depth values from the vertical axis of the plot. In general, in FIG. 15, lower complexity is shown in the shallower overburden with increasing complexity in the lower overburden as the reservoir is approached, with a correspondingly greater concentration of depth planes near the base of the overburden and within the reservoir. In addition, refinement of this approach may be performed when the expected drift of any proposed wells is known, whereby the expected drift of the proposed wells may be included in the drift complexity calculation above.

Figure 16:
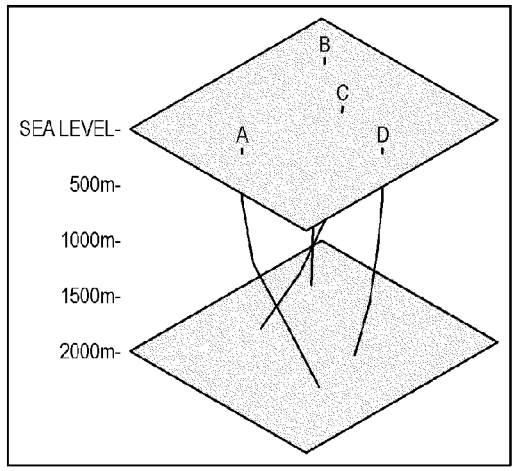
FIGS. 16-22 are perspective views illustrating a feasibility analysis performed on an example subsurface region in accordance with implementations of various technologies and techniques described herein.
Figure 17:
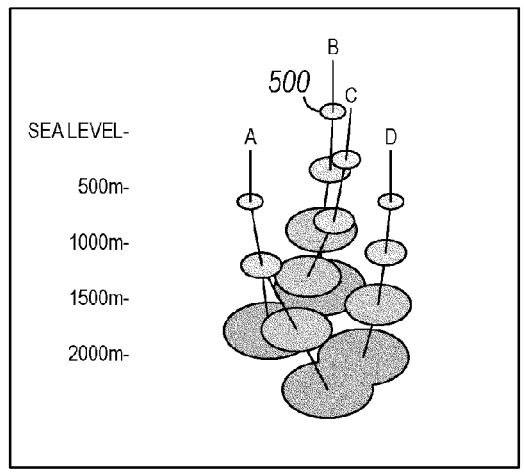
Figure 18:
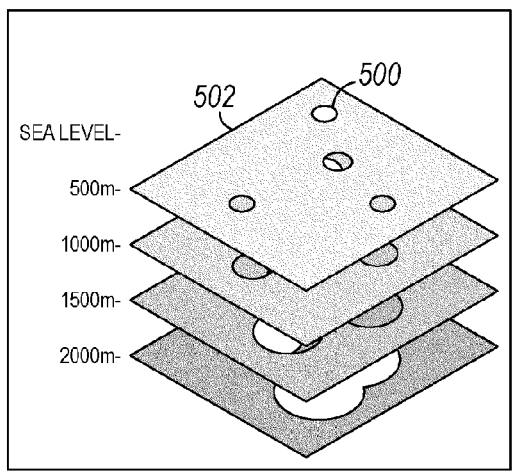

FIGS. 16-22 next illustrate a synthetic example of the use of the herein-described anti-collision framework to conduct a feasibility analysis for proposed well locations. In particular, FIG. 16 illustrates a perspective view of four existing wells A-D extending from sea level to a reservoir depth at 2000 m. FIG. 17 illustrates horizontal uncertainty ellipses 500 obtained at regular depth intervals for all of the existing wells, and FIG. 18 illustrates the uncertainty ellipses 500 projected into infeasible regions on depth planes 502 using the various techniques described above (note that as a result of the infeasible regions being projected onto depth planes 502, the trajectories of the existing wells may be removed in some embodiments as they are generally no longer needed for feasibility analysis).

Figure 19:
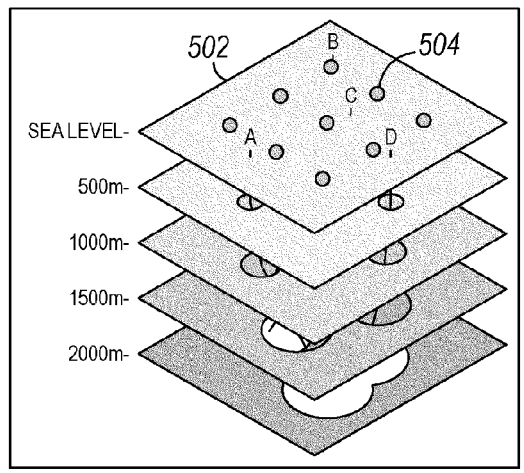
Figure 20:
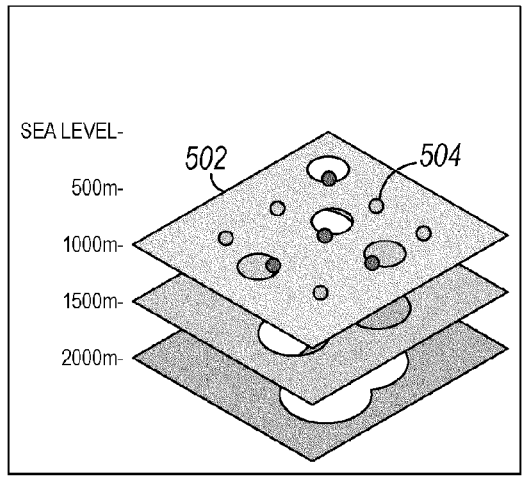
Figure 21:
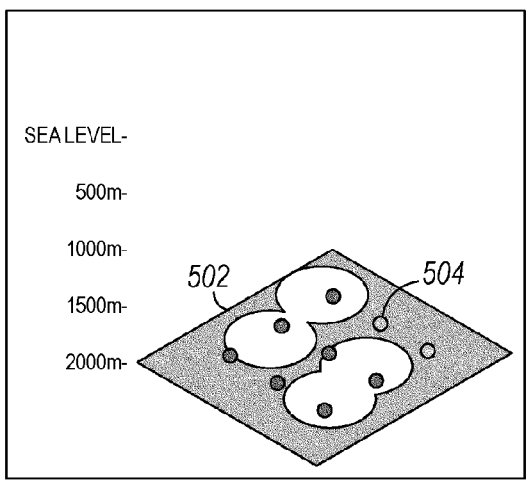
Figure 22:
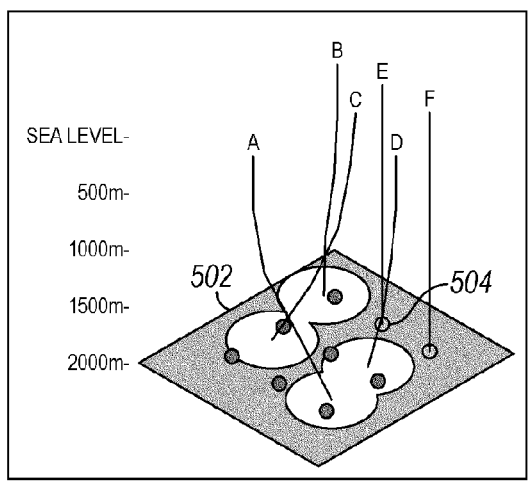

Next, as illustrated in FIG. 19, nine vertical wells 504 are proposed. Then, as illustrated in FIG. 20, beginning at the shallowest (or alternatively, the deepest) depth plane 502, successive intersections with infeasible regions result in some of the candidate wells 504 being rejected (shaded darker in FIG. 20). As shown in FIG. 21, after all depth planes have been checked for feasibility, only two of the original nine candidate wells 504 remain. FIG. 22 then illustrates a final solution with the four existing wells A-D, and two feasible proposed vertical wells labeled E and F.

Figure 23:
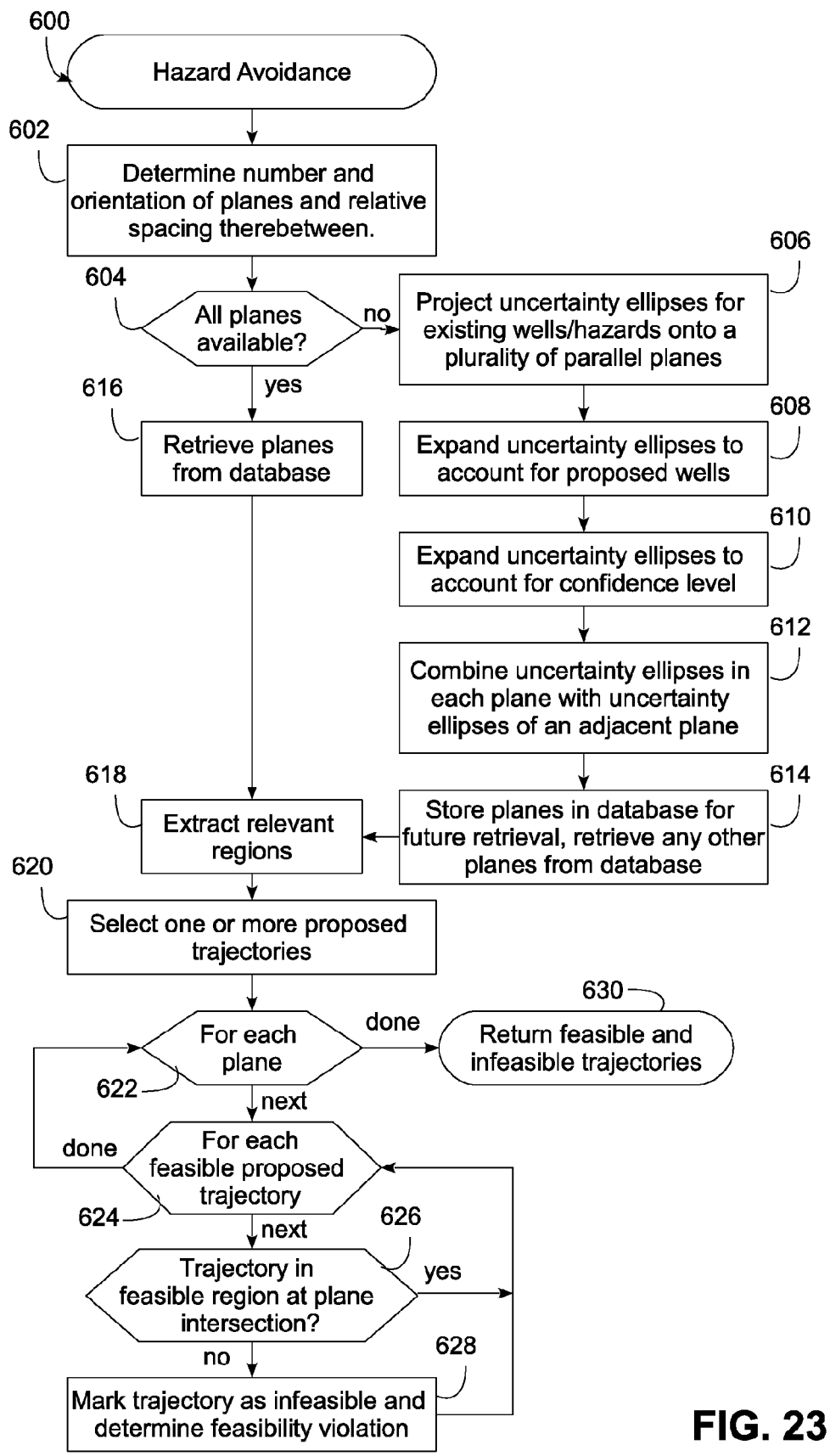
FIG. 23 is a flowchart illustrating an example sequence of operations for a hazard avoidance routine in accordance with implementations of various technologies and techniques described herein.

Now turning to FIG. 23, this figure illustrates an example hazard avoidance routine 600 that may be executed by computer 12 of FIG. 1, e.g., within a petro-technical module 32, to perform hazard avoidance analysis, e.g., to perform anti-collision analysis for one or more proposed wells, to perform well planning analysis, to perform hazard avoidance allowance for subsurface hazards, etc. It will be appreciated by those of ordinary skill in the art having the benefit of the instant disclosure that some operations in workflow 600 may be combined, split, reordered, omitted and/or supplemented with other techniques known in the art, and therefore, the invention is not limited to the particular workflow illustrated in FIG. 23.

Routine 600 begins in block 602 by determining the number and orientation of feasibility planes, as well as the relative spacing therebetween. The number and spacing between feasibility planes may be determined, for example, in the manner discussed above in connection with FIG. 19. In addition, as noted above, the orientation of the feasibility planes may be selected based whether the proposed trajectory is predominantly vertical or predominantly horizontal, which may also be based upon where in the subsurface region the analysis is being performed, as generally trajectories in the overburden are predominantly vertical, while in some instances trajectories in near or within a reservoir are predominantly horizontal. The orientation may be aligned in a Cartesian coordinate system, and may be aligned in a global coordinate system (e.g., depth, latitude and longitude), although it will be appreciated that in other embodiments, the feasibility planes may have different orientations, so long as the feasibility planes are substantially in the same orientation as one another and thus substantially parallel to one another.

Next, block 604 determines whether all of the feasibility planes needed for the analysis are already available in a database. In particular, in some embodiments, it may be desirable, after projecting uncertainty ellipses onto a set of parallel feasibility planes, to then store those feasibility planes in a database for future analysis operations. Since the feasibility planes computed in the manner herein are not oriented along a proposed well trajectory, the feasibility planes may be reused when performing analysis of other proposed well trajectories, and as such, the computational expense of recomputing feasibility planes and uncertainty ellipses may be avoided in some circumstances. In other embodiments, however, no database storage may be used, and feasibility planes and uncertainty ellipses may be computed from scratch for each analysis.

First, in the situation where at least some feasibility planes needed for analysis are not available in the database, block 604 passes control to block 606 to project uncertainty ellipses for the existing wells and/or hazards in a subsurface region onto a set of parallel feasibility planes, e.g., in the manner discussed above in connection with FIG. 9. Then, in block 608, the uncertainty ellipses may optionally be expanded to account for the uncertainty of the proposed well(s), e.g., in the manner discussed above in connection with FIG. 10. Next, in block 610, the uncertainty ellipses optionally may be further expanded to account for a desired confidence level, e.g., in the manner discussed above in connection with FIG. 11. Then, in block 612 the uncertainty ellipses in each feasibility plane may optionally be combined with the uncertainty ellipses in an adjacent feasibility plane (e.g., the immediately shallower plane) to account for the interval between discrete planes, e.g., in the manner discussed above in connection with FIGS. 12-13.

Next, in block 614, the computed feasibility planes are stored in the database, and any additional feasibility planes that may be in the database and needed for the analysis may be retrieved from the database. In addition, returning to block 604, if all feasibility planes needed for the analysis are already stored in the database, block 604 instead passes control to block 616 to retrieve these feasibility planes from the database, thereby bypassing the generation of new feasibility planes.

Upon completion of either of blocks 614 and 616, control passes to block 618 to optionally extract relevant regions from the feasibility planes. For example, if it is known that a proposed well trajectory will only be within a limited volume within a subsurface region, an area within each feasibility plane, or at least a subset of feasibility planes, may be extracted to reduce the area of each feasibility plane that is analyzed during a hazard avoidance operation. As on example, if the feasibility planes are depth planes oriented substantially horizontally, but it is known that a proposed well will be within a 4 square mile area of a 100 square mile oilfield, a 4 square mile area of each feasibility plane may be extracted.

Next, in block 620, one or more proposed well trajectories are selected, and each is initially tagged as a feasible well. Block 622 then initiates a loop to sequentially process each feasibility plane, e.g., for depth planes, either starting at the shallowest or the deepest plane. In other embodiments, feasibility planes may be processed in different orders. For each feasibility plane, block 622 passes control to block 624 to sequentially process each feasible well trajectory (i.e., each well that has not been marked as infeasible). Alternatively, block 624 may process each well regardless of its feasibility (e.g., to determine the maximum feasibility violation).

For each feasible well trajectory, block 624 passes control to block 626 to determine whether the well trajectory is within the feasible region of the current plane. If so, control returns to block 624 to process the next well trajectory. If not, control instead passes to block 628 to mark the well trajectory as infeasible and to determine the feasibility violation (e.g., in terms of distance to the feasible region). Control then returns to block 624 to process the next well trajectory.

Once all well trajectories have been processed for the current plane, block 624 returns control to block 622 to process the next plane. Once all feasibility planes have been processed, block 622 passes control to block 630 to return the feasible and infeasible proposed well trajectories and routine 600 is complete. In addition, block 630 may also return cause and/or magnitude of infeasibility of any infeasible proposed well trajectory. Thereafter, a proposed well trajectory that is determined to be feasible may then be used to drill a wellbore, in a manner generally known in the art.

Various modifications may be made to the illustrated embodiments without departing from the spirit and scope of the invention. For example, while the examples above focus on anti-collision between proposed wells and existing wells, one of ordinary skill in the art having the benefit of the instant disclosure will appreciate that the herein-described techniques may be extended for hazard avoidance in general, e.g., to avoid salt structures or fracture networks in the subsurface. Also, in some embodiments, only a subset of the available feasibility planes may be compared against a proposed well trajectory, i.e., such that not every feasibility plane generated for a subsurface region is analyzed when performing hazard avoidance analysis.

In addition, while the examples above focus on depth planes (i.e., planes normal to the depth dimension), which may be useful in the overburden where well geometry is dominantly vertical or of low inclination, it will be appreciated by one of ordinary skill in the art having the benefit of the instant disclosure that deeper in the overburden or in the reservoir itself, where well inclinations may be very high if not horizontal, vertical planes (i.e., planes extending generally parallel to the depth dimension) may be used to represent trajectory uncertainties. In addition, the drift analysis discussed above may also be applied in these latter situations to determine a suitable orientation and spacing of the vertical planes.

Furthermore, in some embodiments it may be desirable to only consider portions of the feasibility planes that are within the possible region of a proposed well when performing anti-collision analysis. Thus, for example, while each depth plane may cover an entire subsurface region (e.g., an entire oilfield), but it is known that a proposed well will only project through a small part of the region, a portion of each depth plane may be extracted from the overall plane such that only that portion of each depth plane is used for detailed feasibility analysis.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of analyzing hazards for at least one proposed well trajectory extending through a subsurface region, the method comprising:
   performing a comparison of the at least one proposed well trajectory against a plurality of feasibility planes extending substantially parallel to one another in the subsurface region, wherein each feasibility plane includes:
      an infeasible region associated with a hazard in the subsurface region that intersects such feasibility plane, and
      a feasible region distinct from the infeasible region; and
   determining feasibility of the at least one proposed well trajectory based upon the comparison and the feasible regions of the feasibility planes.

2. The method of claim 1, further comprising generating a first feasibility plane among the plurality of feasibility planes, wherein generating the first feasibility plane includes, for each of a plurality of existing well trajectories in the subsurface region that intersect the first feasibility plane, projecting an associated uncertainty ellipse onto the first feasibility plane.

3. The method of claim 2, wherein generating the first feasibility plane further includes expanding at least one uncertainty ellipse projected onto the first feasibility plane to account for uncertainty in the at least one proposed well trajectory.

4. The method of claim 2, wherein generating the first feasibility plane further includes expanding at least one uncertainty ellipse projected onto the first feasibility plane to account for a confidence level.

5. The method of claim 2, wherein generating the first feasibility plane further includes combining at least one uncertainty ellipse projected onto the first feasibility plane with an uncertainty ellipse from an adjacent feasibility plane that is associated with the same existing well trajectory among the plurality of existing well trajectories.

6. The method of claim 2, further comprising storing the first feasibility plane in a database for reuse in a future hazard avoidance analysis operation.

7. The method of claim 1, further comprising retrieving the plurality of feasibility planes from a database prior to performing the comparison.

8. The method of claim 1, wherein the plurality of feasibility planes are substantially normal to and spaced from one another along a depth dimension of a Cartesian coordinate system.

9. The method of claim 1, further comprising extracting a region from one or more of the plurality of feasibility planes prior to performing the comparison.

10. The method of claim 1, wherein the plurality of feasibility planes are non-normal to at least a portion of the at least one proposed well trajectory.

11. The method of claim 1, wherein the feasible region includes a remaining area of the feasibility plane that is not within any infeasible region.

12. A method of analyzing hazards for at least one proposed well trajectory extending through a subsurface region, the method comprising:
performing a comparison of the at least one proposed well trajectory against a plurality of feasibility planes extending substantially parallel to one another in the subsurface region, wherein each feasibility plane includes an infeasible region associated with a hazard in the subsurface region that intersects such feasibility plane; and
determining feasibility of the at least one proposed well trajectory based upon the comparison, wherein
the plurality of feasibility planes are substantially normal to and spaced from one another along a depth dimension of a Cartesian coordinate system, and
the plurality of feasibility planes are substantially normal to a dimension of a global coordinate system.

13. A method of analyzing hazards for at least one proposed well trajectory extending through a subsurface region, the method comprising:
performing a comparison of the at least one proposed well trajectory against a plurality of feasibility planes extending substantially parallel to one another in the subsurface region, wherein each feasibility plane includes an infeasible region associated with a hazard in the subsurface region that intersects such feasibility plane; and
determining feasibility of the at least one proposed well trajectory based upon the comparison, wherein
determining feasibility of the at least one proposed well trajectory based upon the comparison comprises determining from the comparison that a first proposed well trajectory is feasible in response to the first proposed well trajectory not intersecting any infeasible region in any of the plurality of feasibility planes.

14. The method of claim 13, further comprising drilling a wellbore substantially following the first proposed well trajectory after determining feasibility of the first proposed well trajectory.

15. A method of analyzing hazards for at least one proposed well trajectory extending through a subsurface region, the method comprising:
performing a comparison of the at least one proposed well trajectory against a plurality of feasibility planes extending substantially parallel to one another in the subsurface region, wherein each feasibility plane includes an infeasible region associated with a hazard in the subsurface region that intersects such feasibility plane; and
determining feasibility of the at least one proposed well trajectory based upon the comparison, wherein
determining feasibility of the at least one proposed well trajectory based upon the comparison comprises determining from the comparison that a first proposed well trajectory is infeasible in response to the first proposed well trajectory intersecting at least one infeasible region in at least one of the plurality of feasibility planes.

16. The method of claim 15, wherein determining that the first proposed well trajectory is infeasible further comprises determining at least one of a cause and a magnitude of infeasibility for the first proposed well trajectory.

17. An apparatus, comprising:
at least one processing unit; and
program code configured upon execution by the at least one processing unit to analyze hazards for at least one proposed well trajectory extending through a subsurface region by:
performing a comparison of the at least one proposed well trajectory against a plurality of feasibility planes extending substantially parallel to one another in the subsurface region, wherein each feasibility plane includes:
an infeasible region associated with a hazard in the subsurface region that intersects such feasibility plane, and
a feasible region distinct from the infeasible region; and
determining feasibility of the at least one proposed well trajectory based upon the comparison and the feasible regions of the feasibility planes.

18. The apparatus of claim 17, wherein the program code is further configured to generate a first feasibility plane among the plurality of feasibility planes by, for each of a plurality of existing well trajectories in the subsurface region that intersect the first feasibility plane, projecting an associated uncertainty ellipse onto the first feasibility plane.

19. The apparatus of claim 18, wherein the program code is configured to generate the first feasibility plane further by expanding at least one uncertainty ellipse projected onto the first feasibility plane to account for at least one of uncertainty in the at least one proposed well trajectory and a confidence level.

20. The apparatus of claim 18, wherein the program code is configured to generate the first feasibility plane further by combining at least one uncertainty ellipse projected onto the first feasibility plane with an uncertainty plane from an adjacent feasibility plane that is associated with the same existing well trajectory among the plurality of existing well trajectories.

21. A program product, comprising:
a computer readable medium; and
program code stored on the computer readable medium and configured upon execution by at least one processing unit to analyze hazards for at least one proposed well trajectory extending through a subsurface region by:
performing a comparison of the at least one proposed well trajectory against a plurality of feasibility planes extending substantially parallel to one another in the subsurface region, wherein each feasibility plane includes:

an infeasible region associated with a hazard in the subsurface region that intersects such feasibility plane, and a feasible region distinct from the infeasible region; and determining feasibility of the at least one proposed well trajectory based upon the comparison and the feasible regions of the feasibility planes.

\* \* \* \* \*